United States Patent
Osselaere et al.

[11] 3,873,545
[45] Mar. 25, 1975

[54] PYRIDO(2,3d) PYRIMIDINES
[75] Inventors: Jean P. Osselaere, Alleur; Charles L. Lapiere, Tongeren, both of Belgium
[73] Assignee: Les Laboratoires S.M.B., Anciens Etablissements J. Muelberger et R. Baudier, Molenbeek-St.-Jean, Belgium
[22] Filed: Oct. 3, 1972
[21] Appl. No.: 294,650

[30] Foreign Application Priority Data
Sept. 14, 1972 Luxembourg............... 66085
Oct. 5, 1971 Luxembourg............... 64010

[52] U.S. Cl................ 260/256.5 R, 260/247.1, 260/247.2 R, 260/247.2 A, 260/247.5 B, 260/256.4 F, 260/294.8 F, 260/295.5 R, 260/295.5 A, 424/251
[51] Int. Cl.............................................. C07d 51/46
[58] Field of Search...260/247.5 B, 256.4 F, 256.5 R

[56] References Cited
OTHER PUBLICATIONS
Bayer, Acta Chim. Acad. Sci. Hung. 48(4), 353–363 (1966).
Ried et al., Justus Liebigs Ann. Chem. 707, 250–255 (1967).
Taylor et al., J. Am. Chem. Soc. 80, 427–431 (1958).
Taylor et al., J. Org. Chem. 26, 4967–4974 (1961).

*Primary Examiner*—G. Thomas Todd
*Attorney, Agent, or Firm*—Wigman & Cohen

[57] ABSTRACT
Substituted derivatives of pyrido [2,3d] pyrimidine, having the general formula:

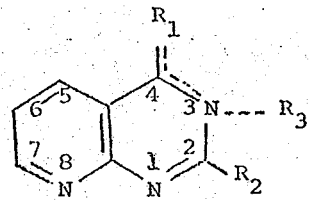

wherein $R_2$ represents a pyridyl, chloropyridyl, sulfonamidopyridyl, sulfonamidochloropyridyl, phenyl, trifluoromethylphenyl, chlorophenyl, nitrophenyl, sulfonamidophenyl, sulfonamidochlorophenyl, methylchlorophenyl, aminophenyl, alkylaminophenyl, dialkylaminophenyl, acylaminophenyl, alkoxyphenyl or pyrimidyl radical; $R_1$, when $R_3$ is nul, represents hydrogen — provided that $R_2$ is different from a 3'-pyridyl radical — a halogen, a substituted or not linear or branched alkyl radical of 1 to 5 carbon atoms, a linear or branched lower alkenyl radical comprising only one carbon-carbon double bond, an alkoxy radical, an alkylthio radical, an amino radical provided that $R_2$ is different from a 3'-pyridyl radical, a mono- or disubstituted amino radical, a carbohydrazide, a carbo-$N_2$-alkylhydrazide, a hydrazino radical, a $N_2$-alkylhydrazino radical, a mono- or disubstituted carboxamide, a substituted or not carboxyl radical, a heterocyclic radical, such as morpholino, piperidino, piperazino, which is substituted or not, a sulfonic radical a substituted or not sulfonamide, or an oxo or thio group when $R_3$ is hydrogen (except when $R_1$ is an oxo group and $R_2$ is phenyl), an hydroxy radical, a linear or branched alkyl radical, substituted or not, a trifluoromethyl radical, a linear or branched alkenyl radical, a cyclopentyl, cyclopentenyl, cyclohexyl, cyclohexenyl, pyridyl, pyrimidyl, substituted or not benzyl, substituted or not phenyl radical.

Said compounds are particularly useful as neuroleptic and tranquillizing agents.

15 Claims, No Drawings

PYRIDO(2,3d) PYRIMIDINES

This invention relates to new derivatives of pyrido [2,3d] pyrimidine, as well as to the preparation and therapeutical use thereof.

The new pyrido [2,3d] pyrimidines of the invention are represented by the general formula I:

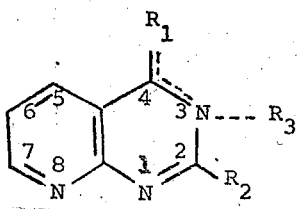

wherein $R_1$ represents a pyridyl, chloropyridyl, sulfonamidopyridyl, sulfonamidochloropyridyl, phenyl, trifluoromethylphenyl, chlorophenyl, nitrophenyl, sulfonamidophenyl, sulfonamidochlorophenyl, methylchlorophenyl, aminophenyl, alkylaminophenyl, dialkylaminophenyl, acylaminophenyl, alkoxyphenyl or pyrimidyl radical.

When $R_1$ is a monovalent radical, $R_3$ is nul and in this case $R_1$ represents hydrogen (provided that $R_2$ is different from a 3'-pyridyl radical), a halogen, a substituted or not, linear or branched alkyl radical of 1 to 5 carbon atoms, a linear or branched lower alkenyl radical comprising only one double carbon-carbon bond, an alkoxy radical, an alkylthio radical, an amino radical (provided that $R_2$ is different from a 3'-pyridyl radical), a mono- or disubstituted amino radical, a carbohydrazide, a carbo-$N_2$-alkylhydrazide, a hydrazino radical, a $N_2$-alkylhydrazino radical, a mono- or disubstituted carboxamide, a substituted or not carboxyl radical, a heterocyclic radical, such as morpholino, piperidino, pyrrolidino, piperazino, which is substituted or not, a sulfonic radical or a substituted or not sulfonamide.

When $R_1$ is an oxo or thio group, $R_3$ is hydrogen (except when $R_1$ is an oxo group and $R_2$ is a phenyl radical), a hydroxy, substituted or not linear or branched alkyl, trifluoromethyl, linear or branched alkenyl, cyclopentyl, cyclopentenyl, cyclohexyl, cyclohexenyl, pyridyl, pyrimidyl, substituted or not benzyl, substituted or not phenyl radical.

When $R_1$ and $R_3$ represent an alkyl group, the latter can be substituted by amino, alkylamino, dialkylamino, halogen, hydroxy, trifluoromethyl groups or a heterocyclic group, such as morpholino, piperidino, pyrrolidino, piperazino ro N-alkylpiperazino.

When $R_1$ represents an amino radical, the latter can be substituted by alkyl, dialkyl, aminoalkyl, alkylaminoalkyl, dialkylaminoalkyl, branched or not lower acyl, aminoacyl, alkylaminoacyl or dialkylaminoacyl groups.

When $R_1$ represents a carboxamide radical, the latter can be substituted by alkyl, dialkyl, aminoalkyl, alkylaminoalkyl or dialkylaminoalkyl groups.

When $R_1$ represents a carboxyl radical, the latter can be substituted by alkyl, aminoalkyl, alkylaminoalkyl or dialkylaminoalkyl groups.

When $R_1$ represents a sulfonamide radical, the latter can be substituted by alkyl, dialkyl or acyl groups. $R_1$ can also be a piperidino-, pyrrolidino-, morpholino-, piperazino- or N-alkylpiperazinosulfonamide.

This is just the same when $R_2$ represents a sulfonamide radical.

When $R_3$ represents a benzyl or phenyl radical, the latter can be substituted by chloro or trifluoromethyl groups in position 2', 3' or 4' on this aromatic ring.

The terms alkyl, alkenyl or lower acyl radical are used as meaning linear or branched radicals having no more than 5 carbon atoms.

The compounds according to the invention can include one or more asymmetrical centers and in this connection they can exist as several stereoisomeric forms or mixtures thereof, also according to the invention.

The new compounds obtained can be used as therapeutical agents either alone or in combination with other therapeutical agents having similar or different effects.

The new derivatives of formula I can be obtained by cyclising substances of formula II:

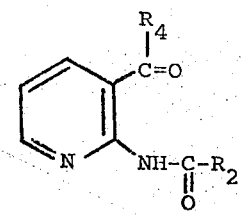

wherein $R_2$ has the hereinbefore mentioned meaning and $R_4$ corresponds to following radicals: carboxyl, carboxylate ester or carboxamide, such as defined for $R_1$, or alkoxy and hydrogen.

Said substances of formula II are new per se and are also within the scope of the present invention.

Derivatives of general formula II, wherein $R_4$ is an alkoxy radical, can advantageously be prepared by condensing alkyl 2-aminonicotinates of general formula IV:

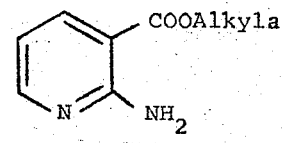

on acid chlorides of formula $R_2 - COCl$ or mixed anhydrides of formula $R_2 - COOCOOC_2H_5$, $R_2$ having the previously mentioned meaning.

One can operate in solution in hydrocarbons, such as benzene for example, or in dioxan, or in any other solvent which can be considered as being inert in the reaction conditions, in presence of at least 1 mol of a tertiary amine, such as for example triethylamine.

Temperatures between room temperature and boiling temperature of the solvent are used during periods varying between 1 and several hours.

A variant consists of carrying out the condensation of one mol of alkyl aminonicotinate on one mol of acid chloride $R_2 - COOCl$ in an amount of pyridine which is equal to 3 times the weight of ester used. In this case, the mixture is brought to boiling by refluxing during 2 to 3 hours.

According to the invention, derivatives of general formula II are cyclised by heating in presence of a solution of ammoniac or of an aliphatic or aromatic primary amine.

As solvent one may use lower alcohols, hydrocarbons, such as benzene, toluene or xylenes, pyridine, the amine itself when the latter is liquid, or any other solvent which can be considered as being consistent with operating conditions.

One operates at temperatures between 80°C and 150°C, under reflux or in a closed vessel, and the heating is maintained for several hours, generally 4 to 6 hours or more.

A large excess of amine is always used: at least 10 mols per 1 mol of the derivative II used.

In the case $R_4$ in above formula II is an alkyl radical and $R_2$ is such as described previously, pyrido [2,3d] pyrimidines of formula I are obtained, wherein $R_1$ is an oxo radical and $R_3$ is one of the previously described radicals or hydrogen.

When $R_4$ is hydrogen or an alkyl radical, a carboxyl or carboxylate radical or a carboxamide radical, such as described for $R_1$ and $R_2$ and such as previously defined, derivatives of formula I are obtained, wherein $R_1$ is hydrogen or an alkyl, carboxyl or carboxamide radical.

Derivatives of general formula I wherein $R_1$ corresponds to an oxo group can also be prepared by condensing an acid chloride of general formula $R_2$ — COCl, with $R_2$ corresponding to the previously given definition, on 2-aminonicotinamide of general formula III:

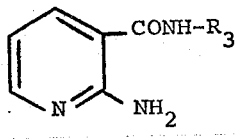

III.

wherein $R_3$ is such as already described.

This is carried out for example by refluxing in the presence of pyridine for a period varying between 4 and 48 hours, by using one mol of derivative III and 2 mols of acid chloride $R_2$ — COCl in an amount of pyridine equal to ten-fold the weight of amide used.

One may also use one mol of derivative III dissolved in ten-fold its weight of pyridine and one mol of acid chloride $R_2$ — COCl. The mixture is boiled by refluxing for 2 hours, then 0.9 mol of phosphorus oxychloride is added and thereafter the heating is extended for the time required.

This invention has also for its object the preparation of derivatives of general formula I which cannot be directly obtained by cyclisation but by substitution on derivatives I.

Thus the reaction of substituted pyrido [2,3d] pyrimidines of formula I wherein $R_1$ is an oxo radical and $R_3$ is hydrogen, with phosphorus oxychloride by refluxing allows to obtain 2-substituted 4-chloropyrido [2,3d] pyrimidines. Oxo derivative is refluxed in 10-fold its weight of phosphorus oxychloride till total dissolution.

According to another process of the invention, said chlorinated derivatives are easily transformed into amino or hydrazino derivatives, substituted or not, by action of ammoniac, primary or secondary amines, cyclic amines, hydrazine or an alkylhydrazine. The reaction is carried out in alcoholic solution or the reagent itself is used as solvent. One uses temperatures between 50° and 100°C, under reflux or in a closed vessel, for a period varrying between one and several hours. The substituents so introduced are such as defined for $R_1$.

From 2-substituted 4-chloropyrido [2,3d] pyrimidines, it is also possible according to the invention to obtain the 4-alkoxy and 4-alkylthio derivatives previously described by reaction with corresponding alkaline alcoholates or thioalcoholates.

According to another preparation process, the reaction of potassium hydrogenosulfide on 4-chloro derivatives of the invention transforms the latter into derivatives of formula I wherein $R_1$ is a thio radical and $R_3$ is hydrogen.

One part of the 4-chloro derivative is refluxed in a solution consisting of 20 parts of ethanol, 20 parts of water and 5 parts of potassium hydrogenosulfide for about 1 hour.

According to another process of the invention, the 4-oxo derivatives of formula I can be transformed into 4-thio derivatives of formula I by action of phosphorus pentasulfide under reflux in pyridine.

One part of 4-oxo derivative, 1,1 part of phosphorus pentasulfide and 5 parts of pyridine are used and one keeps boiling by refluxing for 4 hours.

Another process of the invention has for its object the preparation of [2,3d] pyrimidines of formula I wherein $R_1$ is an oxo radical and $R_3$ is such as previously described.

According to this process, the pyrido [2,3] pyrimidines of formula I wherein $R_1$ is an oxo radical and $R_3$ is hydrogen form, by action of alkaline alcoholates, alkaline salts of formula V:

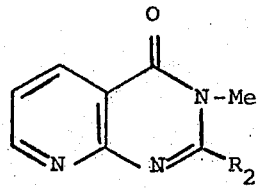

V wherein Me is an alkali metal.

Said salts are prepared by action an equimolecular amount of alkaline alcoholate in alcoholic solution on the oxo derivative. Primary alcohols of 1 to 4 carbon atoms are used. The alcoholic solution of alkaline salt is immediately reacted with an equimolecular amount of a halogenated derivative of formula $R_3X$, with $R_3$ having the meaning already given and X being a halogen, such as Cl, Br or I, and thus corresponding 4-oxo derivatives are obtained.

Another process of the invention relates to the preparation of pyrido [2,3d] pyrimidines of formula I wherein $R_1$ is an oxo radical and $R_2$ is a 3'-nitrophenyl, 3'-sulfonamidophenyl or 3'-sulfonamido-4-chlorophenyl radical, which can also be obtained by nitration or sulfonation of the corresponding phenyl or chlorophenyl derivative.

The nitration is carried out in sulfonitric medium at a temperature of 95°C for 1 to 4 hours. One part of the 4-oxo derivative, 3 parts of concentrated sulfuric acid and 3 parts of fuming nitric acid are used.

The sulfonation is carried out by reacting 10 parts of chlorosulfonic acid and one part of 4-oxo derivative. The solution is heated for 12 hours at 220°C. The sulfonic acid chloride so obtained is treated with an aqueous solution of ammoniac or a primary, secondary or cyclic amine and thus the corresponding sulfonamide is obtained.

The products according to the invention can be purified by a suitable process, such as fractional distillation, crystallisation, counter-current distribution and adsorption.

Other details and features of the invention, which do not limit the scope thereof, are given hereinafter by means of examples of preparation of several compounds of formula I and formula II, as well as with pharmacological results of various of said compounds.

EXAMPLE 1

Ethyl 2-benzoylaminonicotinate

Process 1

To a solution of 17 g of ethyl 2-aminonicotinate in 175 ml of benzene, 10 ml of triethylamine are added under stirring and then 14 g of benzoyl chloride. The solution is stirred for 24 hours at room temperature, the mixture is then evaporated under reduced pressure, the dry residue is taken up with water and extracted with chloroform after verification of the aqueous phase alkalinity. The chloroform extract is dehydrated on calcium chloride, filtered and concentrated under reduced pressure. The evaporation residue is recrystallised from petrolein 100°–140°C. Yield: 74%. Melting point: 106°C.

Process 2

A mixture of 42 g of ethyl 2-aminonicotinate, of 140 ml of anhydrous pyridine and of 37 g of benzoyl chloride is brought to boiling by refluxing for 2 to 3 hours. The cooled solution is evaporated to dryness under reduced pressure and the evaporation residue is taken up with water. After having verified the alkalinity of the aqueous phase, extraction is made with chloroform. The extraction liquid, dehydrated on calcium chloride, is evaporated to dryness under reduced pressure and the residue, recrystallised from petrolein 100°–140°C, has a melting point of 106°C. Yield: 70 to 80%.

Elemental analysis for $C_{15}H_{14}N_2O_3$
Theoretical, %  : C:66.66; H:5.22; N:10.36
Found, %        : C:66.79; H:5.18; N:10.23

EXAMPLE 2

Ethyl 2-nicotinoylaminonicotinate

This substance was prepared according to Process 2 of Example 1 but by using nicotinic acid chloride instead of benzoyl chloride. Melting point: 96°C.

Elemental analysis for $C_{14}H_{13}N_3O_3$
Theoretical, %  C:61.99; H:4.83; N:15.49
Found, %        C:61.98; H:4.84; N:15.20

EXAMPLE 3

Ethyl 2-isonicotinoylaminonicotinate

This product is prepared according to Process 2 of Example 1 but by using isonicotinic acid chloride instead of benzoyl chloride. Melting point: 117°C.

Elemental analysis for $C_{14}H_{13}N_3O_3$
Theoretical, %  C:61.99; H:4.83; N:15.49
Found, %        C:61.75; H:5.11; N:15.61

EXAMPLE 4

Ethyl 2-(3'-nitrobenzoyl)aminonicotinate

This substance was prepared according to Process 2 of Example 1, but by using metanitrobenzoyl chloride instead of benzoyl chloride. Melting point: 126°C.

Elemental analysis for $C_{15}H_{13}N_3O_5$
Theoretical, %  C:57.14; H:4.15; N:13.33
Found, %        C:56.94; H:4.37; N:13.21

EXAMPLE 5

Ethyl 2-(3'-chlorobenzoyl)aminonicotinate

Obtained from metachlorobenzoic acid chloride according to Process 2 of Example 1. Melting point: 131°C.

Elemental analysis for $C_{15}H_{13}N_2O_3Cl$
Theoretical, %  C:59.12; H:4.30; N:9.19
Found, %        C:59.32; H:4.62; N:9.07

EXAMPLE 6

Ethyl 2-(3'-sulfonamido-4'-chlorobenzoyl) aminonicotinate

To the acid chloride prepared from 9 g of 3-sulfonamido-4-chlorobenzoic acid, 150 cc of anhydrous dioxane, 10 ml of triethylamine and 9 g of ethyl 2-aminonicotinate are added. The solution is cold stirred fro 18 hours. The mixture is filtered, dry evaporated under reduced pressure and the evaporation residue is recrystallised from a mixture ethanol-water. Melting point: 198°C.

Elemental analysis for $C_{15}H_{14}N_3O_5SCl$
Theoretical, %  C:46.94; H:3.65; N:10.95; Cl:9.26
Found, %        C:47.12; H:3.84; N:11.07; Cl:9.42

EXAMPLE 7

Ethyl 2-picolinoylaminonicotinate 12.3 g of picolic acid are dissolved in 100 cc of dioxane for analysis. 14 ml of triethylamine are added. The solution so obtained is cooled to 0°C and 10 ml of freshly redistilled ethyl chloroformate are added under stirring. Stirring is still carried out for 30 minutes at room temperature. To the reaction mixture, 18.3 g of ethyl 2-aminonicotinate are added, one agitates for 30 minutes at room temperature and then one heats under stirring at 70°C for 30 minutes. One allows to stand at room temperature overnight. The solution is then evaporated to dryness, the residue is taken up with water and extracted with chloroform after verification of the alkalinity of the aqueous phase. The extraction liquid is dehydrated on calcium chloride, filtered and evaporated to dryness under reduced pressure. The residue is recrystallised from petrolein 100°–140°C. Yield: about 60%. Melting point: 138°C.

Elemental analysis for $C_{14}H_{13}N_3O_3$
Theoretical, %   C:61.99; H:4.83; N:15.49
Found, %         C:61.85; H:4.91; N:15.63

EXAMPLE 8

2-(3'-Pyridyl)-3,4-dihydro-pyrido [2,3d] pyrimidine-4-one

A mixture of 13 g of ethyl 2-aminonicotinate, of 40 ml of anhydrous pyridine and of 11.5 g of nicotinic acid chloride is brought to boiling by refluxing for 2 to 3 hours. The cooled solution is evaporated to dryness under reduced pressure and the evaporation residue is taken up with water. After having verified the alkalinity of the aqueous phase, extraction is made with chloroform. The extraction liquid having been dehydrated on calcium chloride is evaporated to dryness under reduced pressure and the residue obtained, namely ethyl 2-nicotinoylaminonicotinate, is recrystallised from petroleum 100°–140°C. 8.1 g of said recrystallised ethyl 2-nicotinoylaminonicotinate are then heated with 80 ml of anhydrous methanol saturated with ammoniac in an autoclave at 120°C for 4 hours. After cooling, $CH_3OH$ is distilled under reduced pressure. After recrystallisation from methanol and desolvatation in vacuum-drier at 120°C for 4 hours, 6 g of the above-mentioned compound are obtained. Melting point: 295.5°C.

Elemental analysis for $C_{12}H_8N_4O$
Theoretical, %   C:64.28; H:3.60; N:24.98
Found, %         C:64.11; H:3.67; N:24.87

EXAMPLE 9

2-(4'-Pyridyl)-3,4-dihydro-pyrido [2,3d] pyrimidine-4-one

The substance was obtained according to the process of Example 8, by using ethyl 2-isonicotinoylaminonicotinate. After recrystallisation from water and desolvatation in drier at 120°C for 4 hours: Melting point: 301°C Elemental analysis for $C_{12}H_8N_4O$
Theoretical, %   : C:64.28; H:3.60; N:24.98
Found, %         : C:64.53; H:3.70; N:24.83

EXAMPLE 10

2-(2'-Pyridyl-3,4-dihydro-pyrido [2,3d] pyrimidine-4-one

Obtained according to the process of Example 8, by using ethyl 2-picolinoylaminonicotinate. Substance recrystallised from methanol. Melting point: 299.5°C.

Elemental analysis for $C_{12}H_8N_4O$
Theoretical, %   : C:64.28; H:3.60; N:24.98
Found, %         : C:64.22; H:3.82; N:25.12

EXAMPLE 11

2-(3'-chlorophenyl)-3,4-dihydro-pyrido [2,3d] pyrimidine-4-one

Prepared according to the process of Example 8 but by using ethyl 2-(3'-chlorobenzoyl) aminonicotinate instead of ethyl 2-nicotinoylaminonicotinate. Substance recrystallised from a mixture of methanol-water.

Melting point: 268°C
Elemental analysis for $C_{13}H_8N_3OCl$
Theoretical, %   : C:60.60; H:3.13; N:16.31
Found, %         : C:60.62; H:3.32; N:16.48

EXAMPLE 12

2-(4'-Chlorophenyl)-3,4-dihydro-pyrido [2,3d] pyrimidine-4-one

Process 1

5.25 g of 4-chlorobenzoic acid are brought to boiling by refluxing in 50 ml of thionyl chloride. The boiling is maintained till total dissolution and then for a new period of 15 minutes. The solution is evaporated to dryness under reduced pressure, the residue is taken up with 50 ml of n-hexane and after stirring is again evaporated to dryness. To the evaporation residue, 30 ml of anhydrous pyridine and 2.3 g of 2-aminonicotinamide are aded. The mixture is brought to boiling by refluxing for 48 hours. The solution is evaporated to dryness under reduced pressure, the residue is taken up with water, the pH of the aqueous phase is brought to the value of 8 by means of sodium bicarbonate and the residue is separated by filtration, washed with water and recrystallised from a mixture of methanol-water. The collected crystals are dried for 4 hours in vacuum-drier at 120°C. Production: about 3 g. Melting point: 300.5°C Elemental analysis for $C_{13}H_8N_3OCl$
Theoretical, %   : C:60.60; H:3.13; N:16.31
Found, %         : C:60.75; H:3.25; N:16.22

Process 2

A variant of the process consists of treating 5.25 g of 4-chlorobenzoic acid chloride with 45 ml of anhydrous pyridine and 4.6 g of 2-aminonicotinamide. The mixture is refluxed for 2 hours and at this time 4.5 g of phosphorus oxychloride are added therein. The refluxing is continued for an additional period of 48 hours and the solution is then treated as hereinbefore. About 6 g of the hereinbefore mentioned compound are obtained in this case.

EXAMPLE 13

2-(3'-Sulfonamidophenyl)-3,4-dihydro-pyrido [2,3d] pyrimidine-4-one 9 g of 2-phenyl-3,4-dihydro-pyrido [2,3d] pyrimidine-4-one are treated with 90 g of chlorosulfonic acid. The mixture is heated for 12 hours at 120°C. The cooled solution is cautiously poured on ice. The aqueous phase is brought to a pH of 4–5 and the precipitate obtained is filtered. The precipitate is washed with ice water and then stirred for 2 hours in 50 ml of 25% aqueous ammoniac solution. The solution is evaporated to dryness under reduced pressure, taken up with water and made acetic. The crystals which are separated by filtration are washed with water and recrystallised from water. They are then dried in vacuum-drier at 120°C for 4 hours. About 4 g of the hereinbefore mentioned compound are obtained. Melting point: 334°C.

| Elemental analysis for $C_{13}H_{10}N_4O_3S$ | |
|---|---|
| Theoretical, % | : C:51.65; H:3.33; N:18.53 |
| Found, % | : C:51.88; H:3.58; N:18.29 |

EXAMPLE 14

2-(3'-Chloro-4'-sulfonamidophenyl)-3,4-dihydro-pyrido [2,3d] pyrimidine 4-one

This substance is obtained by the process of Example 13 but by using as starting product the 2-(4'-chlorophenyl)-3,4-dihydro-pyrido [2,3d] pyrimidine-4-one obtained according to the process of Example 12. Melting point: 343°C. Elemental analysis for $C_{13}H_9N_4O_3SCl$.

| Theoretical, % | : C:46.37; N:2.69; H:16.64 |
|---|---|
| Found, % | : C:46.14; N:2.84; H:16.79 |

EXAMPLE 15

2-(3'-Nitrophenyl)-3,4-dihydro-pyrido [2,3d] pyrimidine-4-one

Process 1

7 g of 2-phenyl-3,4-dihydro-pyrido [2,3d] pyrimidine-4-one are treated with a mixture of 20 ml of fuming nitric acid and of 20 ml of concentrated sulfuric acid for 3 hours at 90°C. The cooled solution is poured under stirring in 1 litre of water and brought to a pH of 7. The crystals obtained are separated by filtration and recrystallised from a mixture of acetic acid and water. Melting point: above 360°C.

Process 2

Identical to that of Example 8 but by using ethyl 2-(3'-nitrobenzoyl) aminonicotinate. Melting point: above 360°C.

| Elemental analysis for $C_{13}H_8N_4O_3$ | |
|---|---|
| Theoretical, % | : C:58.21; H:3.00; N:20.89 |
| Found, % | :C:58.45; H:3.11; N:21.07 |

EXAMPLE 16

2-(3'-Pyridyl)-4-chloro-pyrido [2,3d] pyrimidine 10 g of 2-(3'-pyridyl)-3,4-dihydro-pyrido [2,3d] pyrimidine-4-one, obtained as described in Example 8, in 100 ml of phosphorus oxychloride are brought to boiling by refluxing till total dissolution. The heating is then extended for one-fourth hour. The cooled solution is then evaporated under reduced pressure till elimination of most of oxychloride and obtention of a syrup liquid which is cautiously poured on ice. After neutralisation with sodium bicarbonate, extraction is made with chloroform. The extraction liquid is dehydrated on freshly calcined sodium sulfate and passed on neutral alumina column. Elution is made with chloroform. After evaporation of the eluate under reduced pressure and at low temperature, paleyellow crystals which are recrystallised from petroleum (boiling point: 100°–140°C). Production: 8 g. Melting point: 126.5°C. Elemental analysis for $C_{12}H_7N_4Cl$

| Theoretical, % | : C:59.39; H:2.90; N:23.08; Cl:14.60 |
|---|---|
| Found, % | : C:59.46; H:3.06; N:23.25; Cl:14.68 |

EXAMPLE 17

2-Phenyl-4-chloro-pyrido [2,3d] pyrimidine

Obtained according to the process of Example 16 from 2-phenyl-3,4-dihydro-pyrido [2,3d] pyrimidine-4-one. Melting point: 170°C.

| Elemental analysis for $C_{13}H_8N_3Cl$ | |
|---|---|
| Theoretical, % | : C:64.61; H:3.34; N:17.39; Cl:14.67 |
| Found, % | : C:64.49; H:3.35; N:17.21; Cl:14.71 |

EXAMPLE 18

2-Phenyl-4-amino-pyrido [2,3d] pyrimidine 7.5 g of 2-phenyl-4-chloro-pyrido [2,3d] pyrimidine and 100 ml of anhydrous methanol saturated with ammoniac are heated in a closed vessel at 120°C for 12 hours. The solution is evaporated to dryness under reduced pressure and the residue is recrystallised from a mixture of methanol and water. Production: 6 g. Melting point: 254°C

| Elemental analysis for $C_{13}H_{10}N_4$ | |
|---|---|
| Theoretical, % | : C:70.27; H:4.50; N:25.22 |
| Found, % | : C:70.07; H:4.60; N:25.08 |

EXAMPLE 19

2-(3'-Pyridyl)-4-dimethylamino-pyrido [2,3d] pyrimidine 5 g of 2-(3'-pyridyl)-4-chloro-pyrido [2,3] pyrimidine and 50 ml of an ethanolic solution of 33% dimethylamine are heated in an autoclave at 80°C for 1 hour. After complete cooling, the solution is evaporated under reduced pressure, the residue is taken up with water and extracted with chloroform after verification of the aqueous phase alkalinity (residue is if desired brought to pH 8–9). The extraction liquid is dehydrated on calcium chloride and evaporated under reduced pressure. After recrystallisation from a mixture of benzenepetroleum 100°–140°C, 3.5 g of substance are obtained. Melting point: 165°C.

| Elemental analysis for $C_{14}H_{13}N_5$ | |
|---|---|
| Theoretical, % | : C:66.92; H:5.21; N:27.87 |
| Found, % | : C:67.13; H:5.19; N:27.98 |

EXAMPLE 20

2-(3'-Pyridyl)-4-diethylamino-pyrido [2,3d] pyrimidine

Obtained according to the process of Example 19 but by using a 20% diethylamine solution in ethanol. Recrystallisation: toluene-petrolein 100°–140°C. Melting point: 126.5°C.

Elemental analysis for $C_{16}H_{17}N_5$
Theoretical, % : C:68.79; H:6.13; N:25.07
Found, % : C:68.71; H:6.27; N:25.14

EXAMPLE 21

2-(3'-Pyridyl)-4-piperidino-pyrido [2,3d] pyrimidine

Obtained according to the process of Example 19 but by using a 20% piperidine solution in ethanol and by refluxing for 6 hours. Recrystallisation: petrolein 100°–140°. Melting point: 138.5°C.

Elemental analysis for $C_{17}H_{17}N_5$
Theoretical, % : C:70.08; H:5.88; N:24.04
Found, % : C:70.24; H:5.94; N:23.96

EXAMPLE 22

2-Phenyl-4-dimethylamino-pyrido [2,3d] pyrimidine

Obtained according to the process of Example 19 but by using 2-phenyl-4-chloro-pyrido [2,3d] pyrimidine. Recrystallisation: petrolein 100°–140°C. Melting point: 168°C Elemental analysis for $C_{15}H_{14}N_4$
Theoretical, % : C:71.98; H:5.64; N:22.38
Found, % : C:72.05; H:5.72; N:22.49

EXAMPLE 23

2-Phenyl-4-diethylamino-pyrido [2,3d] pyrimidine

Obtained according to the process of Example 20 but by using 2-phenyl-4-chloro-pyrido [2,3d] pyrimidine. Recrystallisation: petrolein 100°–140°. Melting point: 120°C.

Elemental analysis for $C_{17}H_{18}N_4$
Theoretical, % : C:75.35; H:6.51; N:20.13
Found, % : C:75.38; H:6.72; N:20.32

EXAMPLE 24

2-Phenyl-4-piperidino-pyrido [2,3d] pyrimidine

Prepared as the derivative described in Example 21 but by using 2-phenyl-4-chloro-pyrido [2,3d] pyrimidine. Recrystallisation: acetone-water. Melting point: 175.5°C.

Elemental analysis for $C_{18}H_{18}N_4$
Theoretical, % : C:74.46; H:6.25; N:19.29
Found, % : C:74.51; H:6.41; N:19.17

EXAMPLE 25

2-Phenyl-4-di-n-propylamino-pyrido [2,3d] pyrimidine 5 g of 2-phenyl-4-chloro-pyrido [2,3d] pyrimidine and 10 g of di-n-propylamine in 100 ml of absolute ethanol are boiled by refluxing for 8 hours. The solution cooled is evaporated to dryness under reduced pressure. The residue is taken up with water, the pH of the aqueous phase is verified and eventually brought to 9. Extraction is made with chloroform, the extraction liquid is dehydrated on calcium chloride and then evaporated to dryness under reduced pressure. The residue is recrystallised from a mixture of ethanol-water. Yield: 65%. Melting point: 139.5°C.

Elemental analysis for $C_{19}H_{22}N_4$
Theoretical, % : C:74.48; H:7.24; N:18.28
Found, % : C:74.20; H:7.45; N:18.14

EXAMPLE 26

2-Phenyl-4-morpholino-pyrido [2,3d] pyrimidine

Prepared as described in Example 25 but by using morpholine. Yield: 72%. Recrystallisation: ethyl alcohol-water. Melting point: 190.5°C.

Elemental analysis for $C_{17}H_{16}N_4O$
Theoretical, % : C:69.85; H:5.51; N:19.16
Found, % : C:69.72; H:5.76; N:18.98

EXAMPLE 27

2-Phenyl-4-(N-methyl-piperazino)-pyrido [2,3d] pyrimidine

Prepared according to the technique of Example 25 but by using N-methylpiperazine. Recrystallisation: petrolein 100°–140°. Melting point: 155°C.

Elemental analysis for $C_{18}H_{19}N_5$
Theoretical, % : C:70.80; H:6.27; N:22.93
Found, % : C:70.67; H:6.52; N:22.81

EXAMPLE 28

2-Phenyl-4-pyrrolidino-pyrido [2,3d] pyrimidine

One proceeds according to the process of Example 25 but by using pyrrolidine. Recrystallisation: ethyl acetate. Melting point: 207°C.

Elemental analysis for $C_{17}H_{16}N_4$
Theoretical, % : C:73.89; H:5.84; N:20.27
Found, % : C:73.97; H:6.01; N:20.56

EXAMPLE 29

2-(3'-Pyridyl)-4-methoxy-pyrido [2,3d] pyrimidine 4 g of 4-chloro-2-(3'-pyridyl)-pyrido [2,3d] pyrimidine are refluxed for 4 hours in 50 ml of sodium methoxide solution containing 800 mg of metal sodium. After evaporation, the residue is taken up with water and extracted with chloroform. The substance obtained by dehydratation of the extraction liquid and evaporation is recrystallised from petrolein 100°–140°. Melting point for 166.5°–167°C.

Elemental analysis for $C_{13}H_{10}N_4O$
Theoretical, % : C:65.54; H:4.23; N:23.51
Found, % : C:65.58; H:4.44; N:23.63

EXAMPLE 30

2-Phenyl-4-methoxy-pyrido [2,3d] pyrimidine

Obtained according to the process of Example 29 but by using 2-phenyl-4-chloro-pyrido [2,3d] pyrimidine. Recrystallisation: petrolein 100°–140°. Melting point: 130.5°C.

Elemental analysis for $C_{14}H_{11}N_3O$
Theoretical, % : C:70.87; H:4.67; N:17.71
Found, % : C:71.07; H:4.73; N:17.93

EXAMPLE 31

2-Phenyl-4-ethoxy-pyrido [2,3d] pyrimidine

Obtained as the derivative described in Example 30 but by using an equivalent solution of sodium ethoxide in ethanol. Recrystallisation: petrolein 100°–140°. Melting point: 168.5°C.

Elemental analysis for $C_{15}H_{13}N_3O$
Theoretical, % : C:71.69; H:5.21; N:16.72
Found, % : C:71.59; H:5.36; N:16.64

EXAMPLE 32

2-Phenyl-3-ethyl-3,4-dihydro-pyrido [2,3d] pyrimidine-4-one 0.25 g of sodium are dissolved in 30 ml of anhydrous butanol. To this butoxide solution, 2.25 g of 2-phenyl-3,4-dihydro-pyrido [2,3d] pyrimidine-4-one are added. After dissolution, 1.6 g of ethyl iodide are poured and one refluxes for 4 hours. The solution is then evaporated under reduced pressure. The residue is taken up with water. It is brought to boiling, decolorised with charcoal and filtered. After cooling, the crystals collected on a filter are dried. They are recrystallised from water and dried in drying-stove at 1050°C for 12 hours. Melting point: 229.5°C.

Elemental analysis for $C_{15}H_{13}N_3O$
Theoretical, % : C:71.69; H:5.21; N:16.72
Found, % : C:71.72; H:5.17; N:16.83

EXAMPLE 33

2-Phenyl-3-methyl-3,4-dihydro-pyrido [2,3d] pyrimidine-4-one

The product was obtained according to the process of Example 32 but by using methyl iodide. Melting point: 258.5°C.

Elemental analysis for $C_{14}H_{11}N_3O$
Theoretical, % : C:70.87; H:3.67; N:17.71
Found, % : C:70.76; H:4.81; N:17.65

EXAMPLE 34

2-Phenyl-4-thiol-pyrido [2,3d] pyrimidine

Process 1

11.2 g of 2-phenyl-3,4-dihydro-pyrido [2,3d] pyrimidine-4-one, 12.2 g of phosphorus pentasulfide and 50 ml of anhydrous pyridine are boiled by refluxing for 4 hours. The solution is slowly poured, when still warm and under stirring, in 200 ml of boiling water. The precipitate formed is allowed to cool and is separated. The precipitate is brought again into aqueous solution by addition of sodium carbonate, then one filters again and the substance is reprecipitated by addition of acetic acid till pH 4–5. The product obtained is recrystallised in a mixture of ethanol-water. Melting point: 210.5°C.

Process 2

A solution of potassium hydrogenosulfide (25 g) in 100 ml of ethanol and 100 ml of water, comprising 5 g of 2-phenyl-4-chloro-pyrido [2,3d] pyrimidine is brought to boiling. The refluxing is then continued for 45 minutes. The solution cooled is neutralised with acetic acid and brought to pH 4–5. The precipitate collected on a filter is recrystallised from a mixture of ethanol-water. Melting point: 210.5°C.

Analysis for $C_{13}H_9N_3S$
Theoretical, % : C:65.27; H:3.77; N:17.57; S:13.39
Found, % : C:65.54; H:3.96; N:17.72; S:13.61

The acute toxicity of substances acording to the invention was determined on mice by statistically calculating, according to Karber and Behrens, the lethal dose for 50% of animals (LD 50) on a period of 24 hours after intraperitoneal injection of different doses of the substances. The results are expressed in terms of mg of substance/kg body weight (see hereinafter Table). It will be noted that their acute toxicity is generally lower than that of papaverine in the same conditions.

The spasmolytic activity was studied on rat ileum maintained in survival in a suitable medium (tyrode). The antogonistic effect of the substances is measured against contractions caused by carbachol, according to the method of cumulative curves of Van Rossum and by comparing with the effect of papaverine selected as reference substance (see also Table I).

When administered to living animals (rat, mouse) at different doses and through different routes (peritoneal, gastric, venous, subcutaneous), the synthetised substances were also subjected to specific tests in order to show and study various pharmacological effects, namely:

neuroleptic effect (catalepsy, palpebral ptose, antogonism against exciting effects of amphetamine)

sedative hypnotic tranquillising effect (condition of animals, tonus and righting-up reflex, ataxy, potentialisation of barbituric effects, protection against convulsive effect of a cardiazol infusion)

analgesic effect (warm water test on rat tail)

exciting effect (behaviour observation)

effect on arterial pressure (measured on anaesthetised animal)

diuretic effect (water and ions)

anti-inflammatory effect (oedoma caused by carragheenin).

Some substances, for example those of Examples 11, 15, 16 and 33, caused catalepsy and palpebral ptose. The most intensive effect was obtained with substance of Example 16, which at doses of 80, 40 and 20 mg/kg intraperitoneally (I.P.) also prevented on rat the appearance of stereotyped chewings, which are normally caused by an intravenous dose of 10 mg/kg of amphetamine (Janssen, Niemegeers and Schellekens: Arzneimittel, Forschung, 15, 104–117, 1965 and Janssen, Niemegeers, Schellekens and Lenaerts, Arzneimittel Forschung, vol. 17, pages 841-854, 1967). Said substances thus show an effect of neurolyptic type on the central nervous system.

Other substances, for example those of Examples 1, 2, 3, 5, 7, 22, 23, 30 and 32, have effects of a hypnosedative or tranquillising type. Some of said substances caused in the animal disturbances of the righting-up reflex from a slight slow-down to the complete stoppage for variable times and according to the doses administred. An ataxy and a tolerance increase against cardiazol in continuous venous perfusion were also noted. A strong potentialisation of the hypnotic effect of an oral dose of 40 mg/kg of secobarbital was demonstrated for example by the substance of Example 2 administrated by gastric probe to a mouse (sleep time duplicated at the dose of 100 mg/kg). In the case of the substance of Example 22, some analgesy level was also remarked.

Some of synthetised substances are thus endowed with interesting pharmacological activities, more especially as their acute toxicity is often low.

In therapeutics, they could be for example used as hypno-sedative and tranquillising agents.

The synthetised substances were also tested to measure their diuretic action on rat. The animals put on a previous hydrous diet for 16 hours receive the substances by gastric intubation (I.G.) and are then placed in metabolism cages. At regular intervals, the volumes of urines are noted and ions Cl, Na and K are determined on the latter. Said results are brought back to 100 g of rat weight and values obtained are compared with those obtained, on the one hand, from control animals and, on the other hand, from animals treated with chlorothiazide and triamterene respectively, selected as reference substances (see Table II: diuretic effect based on total urine volumes from the administration of the substance (time 0) till the moment when diuresis has reached its maximum, the data being brought back to 100 g of rat weight). Amongst the substances endowed with a diuretic action, the product of Example 8 is revealed as particularly useful due to the intensity and the duration of its action. Its effect also appears as a strong sodium elimination while the potassium excretion is not very modified. Said results were confirmed on the dog, particularly at the dose of 1 mg/kg per os.

In therapeutics, some of the synthetised substances could thus be used due to their diuretic effect, for example in cases of oedema or arterial hypertension.

The fact that potassium excretion is not very modified is an additional advantageous point.

Several of the synthetised substances have also shown an anti-inflammatory activity. Said action was shown on rat by the carragheenin oedema test according to Winter (injection of a 1% carragheenin suspension in the plantar pad of the rear paws of the rat). The substances studied are administred by intragastric probe 1 hour before carragheenin. Three hours after carragheenin injection, the swelling of the paws is measured by means of the Lence plethysmometer, the eventual reduction with respect to control rats is calculated and comparison is made with phenyl butazone and niflumic acid, selected as reference substances.

Some of the synthetised substances are endowed with an anti-inflammatory activity able to be used in therapeutics, for example in the case of acute or chronic rheumatic diseases.

The effect of the synthetised substances on the arterial pressure of the rat was studied as acute experimentation. This effect is not very important. The substances of Examples 23, 25 and 29 decrease the basic arterial pressure, while the substance of Example 19 has additionally adrenolytic effects.

TABLE I

| Example, n° | LD50 mg/kg(I.P.) | Spasmolytic action, conc. $10^{-5}$M |
|---|---|---|
| 1 | >450 | 10 |
| 2 | 600 | 24 |
| 3 | 550 | 0 |
| 4 | >550 | 22 |
| 5 | >550 | 17 |
| 7 | >550 | 5 |
| 8 | 367 | 4 |
| 9 | 500 | 14 |
| 10 | 500 | 10 |
| 11 | 450 | 14 |
| 12 | — | 13 |
| 13 | 550 | 7 |
| 15 | >550 | 6 |
| 16 | 88 | 6 |
| 17 | 200 | 20 |
| 18 | 134 | 4 |
| 22 | 92 | 11 |
| 23 | 125 | 16 |
| 24 | 433 | 22 |
| 25 | 267 | 4 |
| 26 | 108 | 13 |
| 27 | 75 | 14 |
| 28 | 367 | 40 |
| 30 | 134 | 15 |
| 31 | — | 4 |
| 32 | 300 | 6 |
| 33 | 200 | 2 |
| 34 | 467 | 24 |
| papaverine base | 158 | 40 |

TABLE II

| Example n° | Dose, mg/kg(I.G.) | Time, hrs. | Diuretic effect, % |
|---|---|---|---|
| 1 | 5 | 0–32 | 185 |
| 4 | 10.0 | 0–24 | 210 |
| 6 | 2.50 | 0–8 | 150 |
| | | 0–8 | 525 |
| 8 | 1.25 | 0–24 | 550 |
| | | 0–32 | 540 |
| 9 | 10.0 | 0–32 | 420 |
| 10 | 10.0 | 0–32 | 320 |

TABLE II – Continued

| Example n° | Dose, mg/kg(I.G.) | Time, hrs | Diuretic effect,% |
|---|---|---|---|
| 13 | 10.0 | 0–8 | 150 |
| 14 | 10.0 | 0–8 | 170 |
| 16 | 2.50 | 0–32 | 205 |
| 18 | 10.0 | 0–8 | 255 |
| 22 | 10.0 | 0–8 | 235 |
| 23 | 2.50 | 0–8 | 205 |
| 24 | 5.0 | 0–8 | 180 |
| 26 | 5.0 | 0–24 | 165 |
| 30 | 5.0 | 0–32 | 155 |
| 31 | 2.50 | 0–24 | 155 |
| 32 | 1.25 | 0–24 | 175 |
| 33 | 2.50 | 0–32 | 260 |
| 34 | 1.25 | 0–8 | 220 |
| Chlorothiazide | 2.50 | 0–32 | 285 |
| Triamterene | 2.50 | 0–8 | 190 |
| " | 10.0 | 0–24 | 235 |
| Controls |  |  | 100 |

The numbers given in the first column of each of said Tables correspond to preparation examples of products of the invention, given hereinbefore.

The present invention has also for its object therapeutical compositions which contain as active constituents one or more compounds of general formulas I and II, used alone or with other active substances having similar or different effects, in mixture with a suitable pharmaceutical carrier. Compositions can be solid such as uncoated tablets or tablets coated with one or more coatings, cachets, gelules, soluble or dispersable powders, suppositories or liquids, such as solutions, eye-washes, suspensions, emulsions, syrups, preparations intended to be parenterally administred, including the pulmonary or branchial ways, for example as aerosol.

The solid compositions for oral use can be prepared by mixing one or more substances according to the invention, for example with milk sugar, powder sugar, starch, talc, and with products intended to delay or extend the effects, for example cellulose acetophthalate, glyceryl stearates, ion exchange resins.

The suppositories can be prepared by incorporating one or more substances according to the invention with cocoabutter for example, or with any other suitable substance, such as mono-, di- and triglycerides of saturated fatty acids.

The liquid compositions can be prepared for example by dissolving, suspending or emulsifying, at the time of the preparation or directly before administration, one or more substances according to the invention and moreover any other product the presence of which is considered as desirable or necessary, such as for example preservative agents, such as methyl and propyl p-hydroxybenzoates, thickeners and emulsifiers such as cellulose derivatives and polyoxyethylene sorbitan esters, sweetening and flavouring agents such as sugar, saccharin, sorbitol, natural or synthetic oils, isotonising agents such as sodium chloride, or buffers such as sodium phosphates, in distilled water, in other acceptable hydroxylated liquids, such as ethanol, glycerin, some glycols, in mixtures of said solvents or in pharmaceutically acceptable oils.

We claim:

1. A substituted derivative of pyrido (2,3d) pyrimidine, having the formula:

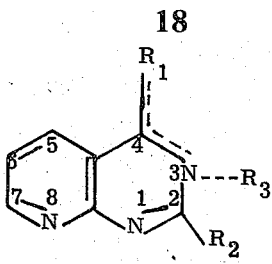

I wherein $R_2$ represents a pyridyl, phenyl, chlorophenyl, sulfonamidophenyl, sulfonamidochlorophenyl or nitrophenyl radical; $R_1$ represents a halogen, an alkoxy radical of 1 to 5 carbon atoms, an amino radical provided that $R_2$ is different from a 3-pyridyl radical, an alkylamino radical with 1 to 5 carbon atoms, a dialkylamino radical in which the alkyl radicals comprise 1 to 5 carbon atoms respectively, a morpholino, piperidino or pyrrolidino radical, a N-alkylpiperazino radical in which the alkyl radical comprises 1 to 5 carbon atoms, or an oxo or thio radical; and $R_3$ is nil when $R_1$ is a monovalent radical, or hydrogen (except when $R_1$ is oxo and $R_2$ is phenyl) or an alkyl radical having 1 to 5 carbon atoms.

2. A substituted derivative of pyrido (2,3d) pyrimidine, having the formula:

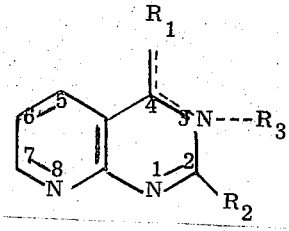

I wherein $R_1$ is an amino radical or an alkyl or dialkyl amino radical where the alkyl group has from 1 to 5 carbon atoms; $R_2$ is phenyl; and $R_3$ is hydrogen or an alkyl radical having 1 to 5 carbon atoms.

3. 2-(3'-pyridyl)-4-diethylamino-pyrido (2,3d) pyrimidine.

4. 2-phenyl-4-diethylamino-pyrido (2,3d) pyrimidine.

5. 2-phenyl-4-dimethylamino-pyrido (2,3d) pyrimidine.

6. 2-phenyl-4-pyrrolidino-pyrido (2,3d) pyrimidine.

7. 2-phenyl-4-(N-methyl-piperazino)-pyrido (2,3d) pyrimidine.

8. 2-phenyl-4-piperidino-pyrido (2,3d) pyrimidine.

9. 2-(3-pyridyl)-3,4-dihydro-pyrido (2,3d) pyrimidine-4-one.

10. 2-phenyl-3-ethyl-3,4-dihydro-pyrido (2,3d) pyrimidine-4-one.

11. 2-phenyl-3-methyl-3,4-dihydro-pyrido (2,3d) pyrimidine-4-one.

12. 2-(4-pyridyl)-3,4-dihydro-pyrido(2,3d) pyrimidine-4-one.

13. 2-(2-pyridyl-3,4-dihydro-pyrido (2,3d) pyrimidine-4-one.

14. 2-(3-chloro-4-sulfonamidophenyl)-3,4-dihydro-pyrido (2,3d) pyrimidine-4-one.

15. 2-(3-sulfonamidophenyl)-3,4-dihydro-pyrido (2,3d) pyrimidine-4-one.

* * * * *

UNITED STATES PATENT OFFICE
CERTIFICATE OF CORRECTION

PATENT NO. : 3,873,545
DATED : March 25, 1975
INVENTOR(S) : Jean P. Osselaere and Charles L. Lapiere It is certified that error appears in the above-identified patent and that said Letters Patent are hereby corrected as shown below:

Column 1, line 51, "ro" should read -- or --.

Column 2, change "COOAlkyla" to --COOAlkyl-- in Formula IV;

Column 3, line 68, change "varrying" to --varying--;

Column 15, line 34, change "slow-down" to --slowing-down--;

Column 17, line 52, change "hydrozybenzoates" to
    --hydroxybenzoates--;

Column 18, line 14, change "3-pyridyl" to --3'pyridyl--;

Column 18, claim 9, change "3-pyridyl" to --3'pyridyl--;

Column 18, claim 12, change "(4-pyridyl)" to --(4'-pyridyl)--;

Column 18, claim 13, change "(2-pyridyl)" to --(2'-pyridyl)--;

Column 18, claim 14, change "(3-chloro-4" to --(3'-chloro-4 --;

Column 18, claim 15, change "3-" to --3'- --.

Signed and Sealed this twenty-eight Day of October 1975

[SEAL]

Attest:

RUTH C. MASON
*Attesting Officer*

C. MARSHALL DANN
*Commissioner of Patents and Trademarks*